United States Patent [19]
Inoue et al.
[11] Patent Number: 4,550,794
[45] Date of Patent: Nov. 5, 1985

[54] MOTORCYCLE HAVING AN ENGINE WITH A SUPERCHARGER

[75] Inventors: Kazuo Inoue, Tokyo; Tsuneo Otsuka, Wako, both of Japan

[73] Assignee: Honda Giken Kogyo Kabushiki Kaisha, Tokyo, Japan

[21] Appl. No.: 339,472

[22] Filed: Jan. 15, 1982

[30] Foreign Application Priority Data

| | | | |
|---|---|---|---|
| Jan. 14, 1981 | [JP] | Japan | 56-4368 |
| Jan. 20, 1981 | [JP] | Japan | 56-6660 |
| Jan. 20, 1981 | [JP] | Japan | 56-6662 |
| Jan. 20, 1981 | [JP] | Japan | 56-6663 |
| Jan. 22, 1981 | [JP] | Japan | 56-8225 |
| Jan. 26, 1981 | [JP] | Japan | 56-9823 |

[51] Int. Cl.[4] ..... B60K 13/00
[52] U.S. Cl. ..... 180/219; 60/605; 123/559
[58] Field of Search ..... 180/219, 225, 229; 60/605; 123/559

[56] References Cited

U.S. PATENT DOCUMENTS

| | | | |
|---|---|---|---|
| 1,249,072 | 12/1917 | Gustafson | 180/225 |
| 2,720,273 | 10/1955 | Johnson et al. | 180/229 |
| 3,521,904 | 7/1970 | Sheffer | 180/219 |
| 3,726,084 | 4/1973 | Meier et al. | 60/605 |
| 3,757,882 | 9/1973 | Honda | 180/219 |
| 3,919,896 | 11/1975 | Foster | 180/225 |
| 4,475,617 | 10/1984 | Minami et al. | 180/219 |

FOREIGN PATENT DOCUMENTS

| | | | |
|---|---|---|---|
| 862702 | 3/1941 | France | 123/559 |
| 429921 | 2/1948 | Italy | 180/225 |
| 118907 | 9/1979 | Japan | 180/219 |

OTHER PUBLICATIONS

Cycle Guide, Sep. 1972, pp. 54–57.
Motorcyclist, Feb. 1981, pp. 56–59.

*Primary Examiner*—Joseph F. Peters, Jr.
*Assistant Examiner*—Kenneth R. Rice
*Attorney, Agent, or Firm*—Armstrong, Nikaido, Marmelstein & Kubovcik

[57] ABSTRACT

A motorcycle having an engine with a turbo-supercharger is disclosed herein. A rear fork is pivoted to the frame member for vertical oscillation and the supercharger is disposed at the back of the engine below the pivot point of the rear fork relative to the frame member so that it can be installed in an exposed manner for effective cooling and protected from contact with other obstacles without interference with other members.

11 Claims, 8 Drawing Figures

MOTORCYCLE HAVING AN ENGINE WITH A SUPERCHARGER

BACKGROUND OF THE INVENTION

The present invention relates to a motorcycle having an engine with a supercharger in which intake air fed to the engine is compressed to increase the charging efficiency for increased output power of the engine.

SUMMARY OF THE INVENTION

An object of the present invention is to provide a motorcycle of the type described above, in which a supercharger can be installed in an exposed manner so that it does not interfere with, nor comes into contact with, other members without affecting the installation or functions of the existing devices.

Another object of the present invention is to provide a motorcycle of the type described above, in which a turbine of the supercharger, which is subjected to high temperatures, can be effectively cooled.

A further object of the present invention is to provide a motorcycle of the type described above, in which the heat of exhaust gas discharged from the turbine of the supercharger and from the muffler does not affect the transmission device that couples the output shaft of the engine to the rear wheel.

Still further object of the present invention is to provide a motorcycle of the type described above, in which the exhaust gas from each of the cylinders of the engine effectively and stably drives the turbine of the supercharger to enhance the charging efficiency for the cylinders, and in which the exhaust system inclusive of the turbine is constructed to present good appearance.

The above and other objects, features and advantages of the invention will become apparent from the following detailed description of a few preferred embodiments when taken in conjunction with the accompanying drawings.

BRIEF DESCRIPTION OF THE DRAWINGS

FIGS. 1 to 3 illustrate a first embodiment of the present invention, in which;

FIG. 1 is a side view showing the whole motorcycle equipped with a turbosupercharged engine;

FIG. 2 is a section view schematically illustrating the turbosupercharged engine;

FIG. 3 is a schematic plan view;

FIG. 5 and 6 illustrate a third embodiment according to the present invention, in which;

FIG. 5 is a view similar to FIG. 1;

FIG. 6 is a schematic plan view of the turbosupercharged engine;

FIGS. 7 and 8 illustrate a fourth embodiment according to the present invention, in which;

FIG. 7 is a view similar to FIG. 1; and

FIG. 8 is a schematic plan view of the turbosupercharged engine.

DESCRIPTION OF THE PREFERRED EMBODIMENTS

Figure 1:
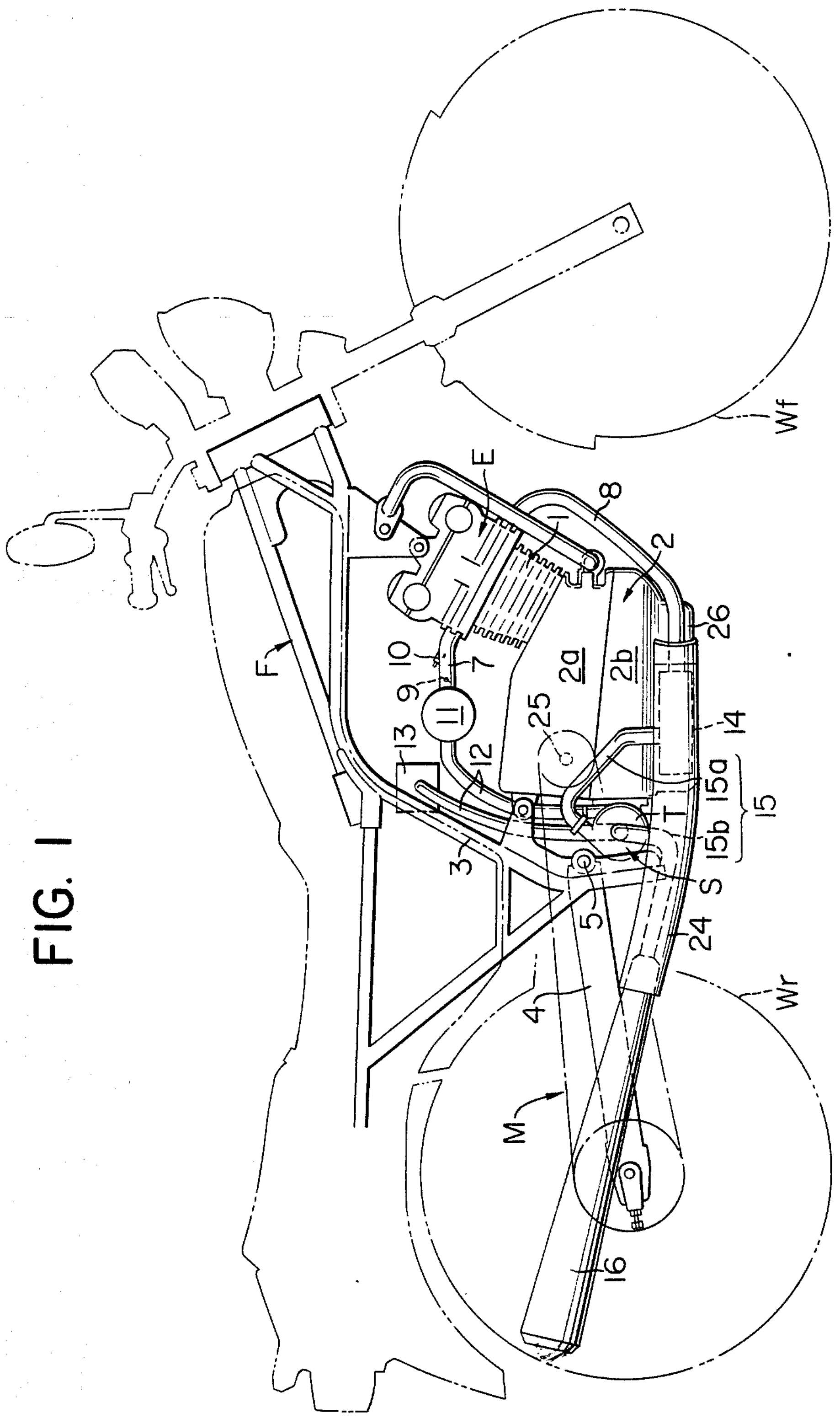

Embodiments of the present invention will be described below in conjunction with the drawings. In the following description and drawings, the same or corresponding members are denoted by the same reference numerals.

Figure 2:
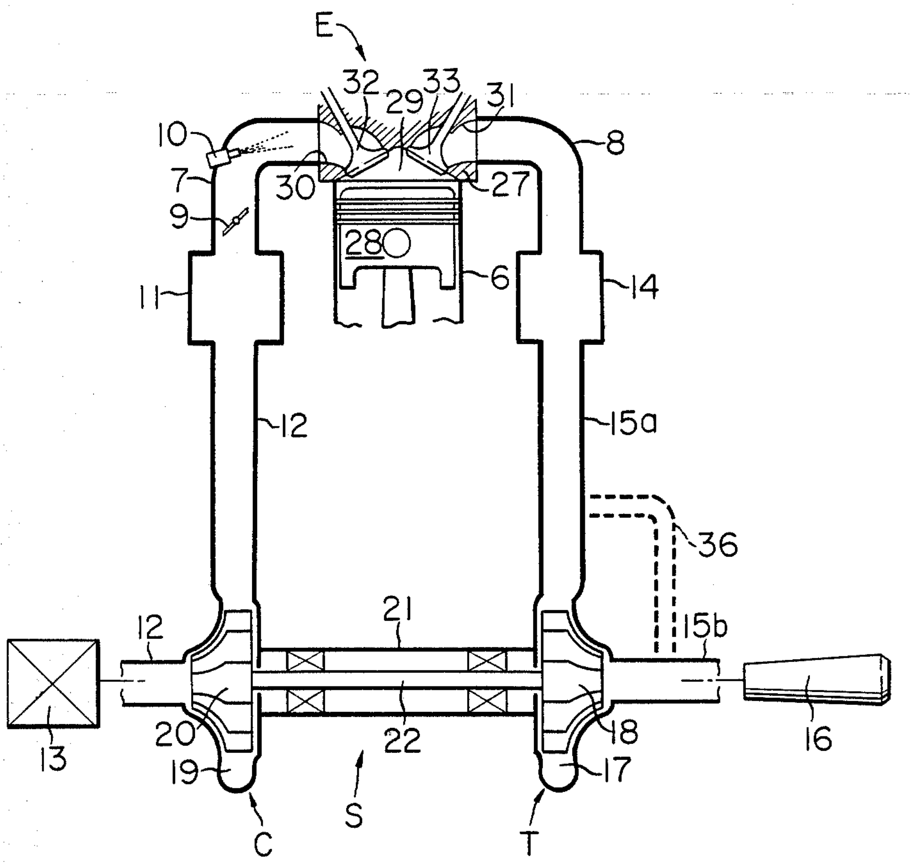
Figure 3:
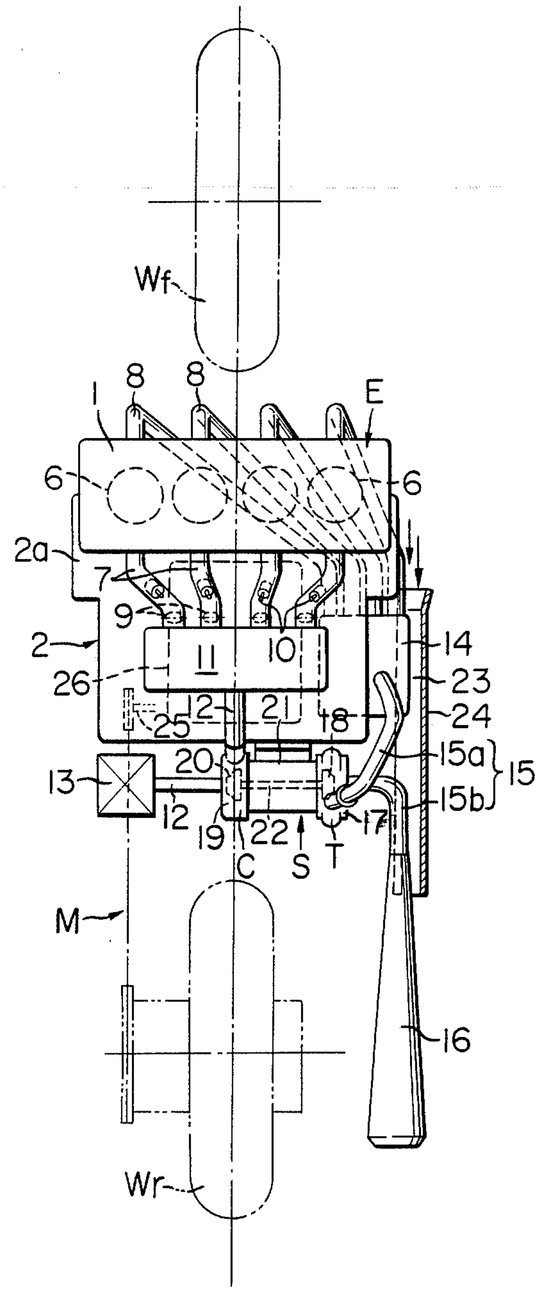

First, FIGS. 1 to 3 illustrate a first embodiment of the present invention. In FIG. 1, an engine E consisting of a nearly erected engine block 1 and a transmission case 2 that also serves as a crank case being attached to the lower end of the engine block 1, is supported in a suspended manner by a frame F of a motorcycle at a position midway between the front wheel Wf and the rear wheel Wr. The transmission case 2 consists of an upper case **2*a* and a lower case 2*b* that are coupled together as a unitary structure and that can be divided into an upper unit and a lower unit. A turbosupercharger S is installed on the back surface of the lower case 2*b***.

A front end of a rear fork 4 is swingably supported, via a shaft 5, by a center tube 3 of the frame F above the turbosupercharger S, and the rear wheel Wr is rotatably supported at the rear end of the rear fork in a customary manner.

Construction of the engine E provided with the turbosupercharger S will be described below with reference to FIGS. 1, 2 and 3. Four cylinders 6 are formed in the cylinder block 1; a piston 28 is slidably fitted in each cylinder 6; a cylinder head 27 is secured to the upper portion of the cylinder block 1; a combustion chamber 29 is defined by the cylinder head 27 and the piston 28; an intake port 30 and an exhaust port 31 are formed in each combustion chamber 29; and the ports 30 and 31 are opened and closed alternatively by an intake valve 32 and an exhaust valve 33.

An intake manifold consisting of four independent intake pipes 7, 7, . . . communicated with each of the intake ports 30, is connected to the back surface of the cylinder block 1 corresponding to each of the cylinders 6. An exhaust manifold consisting of four independent exhaust pipes 8, 8, . . . communicated with each of the exhaust ports 31, is connected to the front surface of the cylinder block 1 corresponding to each of the cylinders 6. Each intake pipe 7 has a throttle valve 9 and a fuel injection nozzle 10 that is located at a position on the downstream side of the valve 9. The upstream ends of the four independent intake pipes 7, 7, . . . are connected to the front surface of a prechamber 11 that is disposed above the transmission case 2, and the prechamber 11 is connected to an air cleaner 13 via a common intake pipe 12. Further, the downstream ends of the four independent exhaust pipes 8, 8, . . . are connected to a single exhaust collector box 14 which is disposed at a lower portion on one side of the engine E (at a lower portion on the right side of the transmission case 2 in FIG. 3). The exhaust collector box 14 is connected to a muffler 16 disposed on one side of the rear wheel Wr via a common exhaust pipe 15. The turbosupercharger S is provided between the common exhaust pipe 15 and the common intake pipe 12.

The turbosupercharger S has a turbine T which is installed in the common exhaust pipe 15 and a compressor C which is installed in the common exhaust pipe 12. The turbine T consists of a turbine wheel 18 which is accommodated in a turbine housing 17 that is formed in the common exhaust pipe 15, and the compressor C consists of a compressor wheel 20 that is accommodated in a compressor housing 19 that is formed in the common intake pipe 12. The two housings 17, 19 are coupled together as a unitary structure via a bearing holder 21, and the two wheels 18 and 20 are coupled together by a rotary shaft 22 that is supported by the bearing holder 21.

To mount the turbosupercharger S on the transmission case 2, the bearing holder 21 with the turbine T and the compressor C being arrayed in the right and left directions of the vehicle, is secured to the back surface of the lower case 2*b* of the transmission case 2 at a position nearer to the exhaust collector box 14 than the center in the transverse direction of the vehicle. Therefore, the turbine T is disposed adjacent to the outer side of the exhaust collector box 14 of the transmission case 2.

An upstream half portion 15*a* of the common exhaust pipe 15 rises aslantly from the upper surface of the exhaust collector box 14 and is coupled to the upper circumferential portion of the turbine housing 17. Further, a downstream half portion 15*b* of the exhaust pipe 15 protrudes from a central portion on the outer side of the turbine housing 17, stretches along an extension of the independent exhaust pipe 8 as viewed from the side of the vehicle, and is coupled to the muffler 16. A face plate 24 is provided to cover, maintaining a ventilation gap 23, the outer surface of the exhaust collector box 14 and a portion of the common exhaust pipe 15 stretching from the rear end of the outermost exhaust pipe 8 to the front end of the muffler 16. The face plate 24 is secured to brackets (not shown) that are protruded from the exhaust collector box 14 and the muffler 16. The front end of the face plate 24 is outwardly bent to promote the introduction of air into the ventilation gap 23.

When the engine E is in operation, the driving power is taken out from the output shaft 25 of the transmission unit and is transmitted to the rear wheel Wr via a chain transmission device M in a customary manner. The chain transmission device M is disposed on the side opposite to the exhaust system which consists of the exhaust collector box 14, turbine T, muffler 16, and the like, with the rear wheel Wr disposed therebetween.

The exhaust gas exhausted into the exhaust pipes 8 from the cylinders 6 in the exhaust stroke of the engine E meets in the exhaust collector box 14, and passes through the turbine T via common exhaust pipe 15, while giving exhaust energy to the turbine wheel 18. Therefore, the turbine wheel 18 rotates to drive the compressor wheel 20 via rotary shaft 22. The air introduced from the air cleaner 13 into the common intake pipe 12 is compressed by the compressor C, sent to the prechamber 11, distributed into the independent intake pipes 7, and adjusted in its flow rate by the throttle valves 9. Then, the air is mixed with the fuel injected from the injection nozzles 10, and is supplied into the cylinders 6 during the intake stroke of the engine E. Thus, the mixture is charged into the cylinders 6 highly efficiently so that the engine produces increased output due to the combustion of the supercharged mixture.

The pulsating pressure, which develops in the independent intake pipes 7 due to the intermittent operation of the intake valves when the engine, is in operation, is attenuated in the prechamber 11. Therefore, the surging phenomenon does not take place in the compressor C.

Reference numeral 26 denotes an oil pan that is formed in the bottom of the transmission case 2 as a unitary structure.

Figure 4:
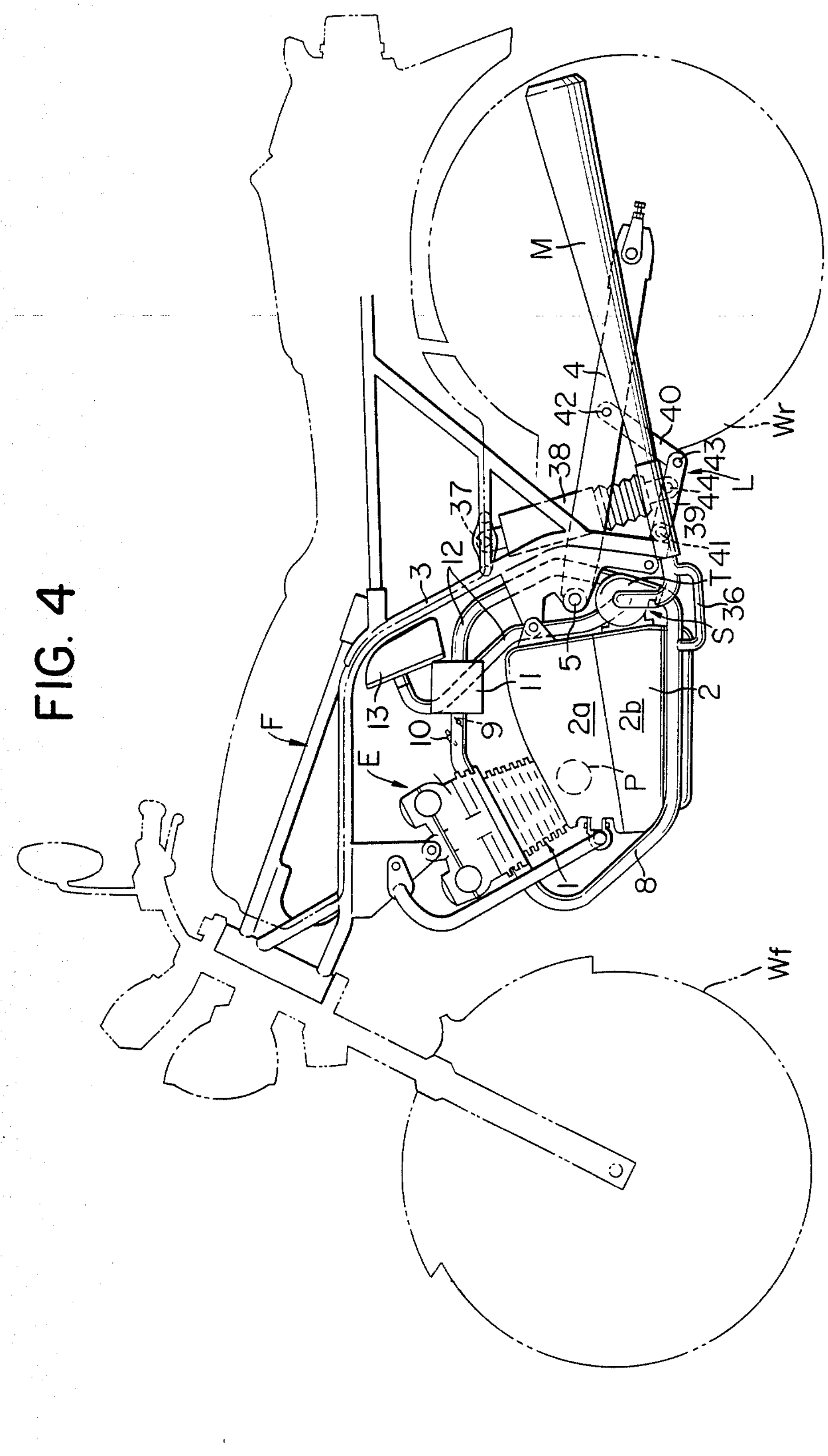
FIG. 4 is a side view showing the whole motorcycle according to a second embodiment of the present invention.

FIG. 4 illustrates a second embodiment of the present invention, which is nearly the same as the first embodiment except the undermentioned respects. Namely, a waste gate 36 is connected to the upstream half portion 15*a* and to the downstream half portion 15*b* of the common exhaust pipe 15 to by-pass the turbin T as shown in FIG. 4 and as indicated by dotted lines in FIG. 2. Part of the exhaust gas from the engine E is allowed to flow through the waste gate 36 thereby to adjust the pressure fed to the turbine T.

Further, the front end of the rear fork 4 is swingably supported, via shaft 5, by the center tube 3 of the frame F at a position above the turbosupercharger S that is installed on the back surface of the transmission case 2, and the rear wheel Wr is rotatably supported at the rear end of the rear fork in a customary manner.

A rear damper 38 is pivotted as designated at 37 to the frame F to move in the back and forth directions, and the lower end of the rear damper 38 is coupled to the rear fork 4 via a link mechanism L. The link mechanism L consists of a first link 39 of which the one end is pivotted as designated at 41 to the lower end of the frame F, and a second link 40 of which the one end is pivotted as designated at 42 to a middle portion of the rear fork 4, the free ends of the first and second links being rotatably coupled together by a pin 43. The lower end of the rear damper 38 is connected to the middle portion of the first link 39. In the thus constructed link mechanism L, the amount of deflection of the rear damper 38 increases as the rear fork 4 moves upwards, i.e., the amount of deflection of the rear damper 38 increases as the rear wheel Wr moves upwards. That is, the amount of deflection of the rear damper changes in a curved manner as the rear wheel W moves upwards.

Figure 5:
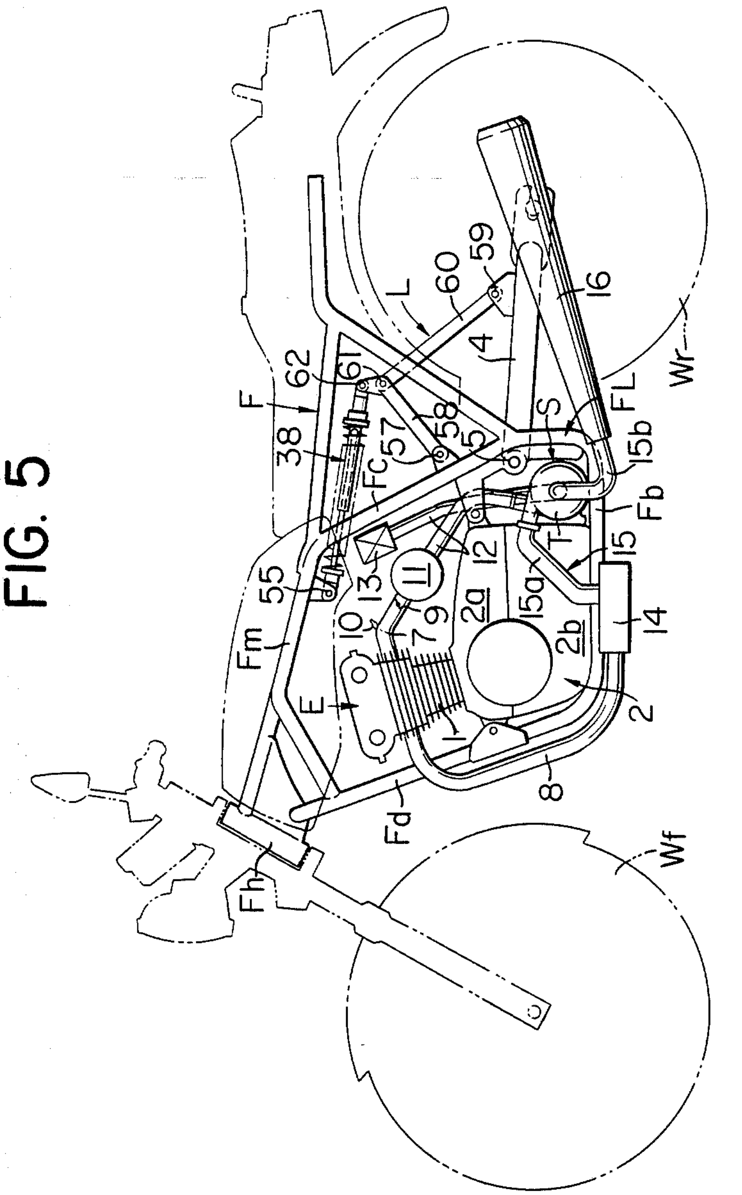
Figure 6:
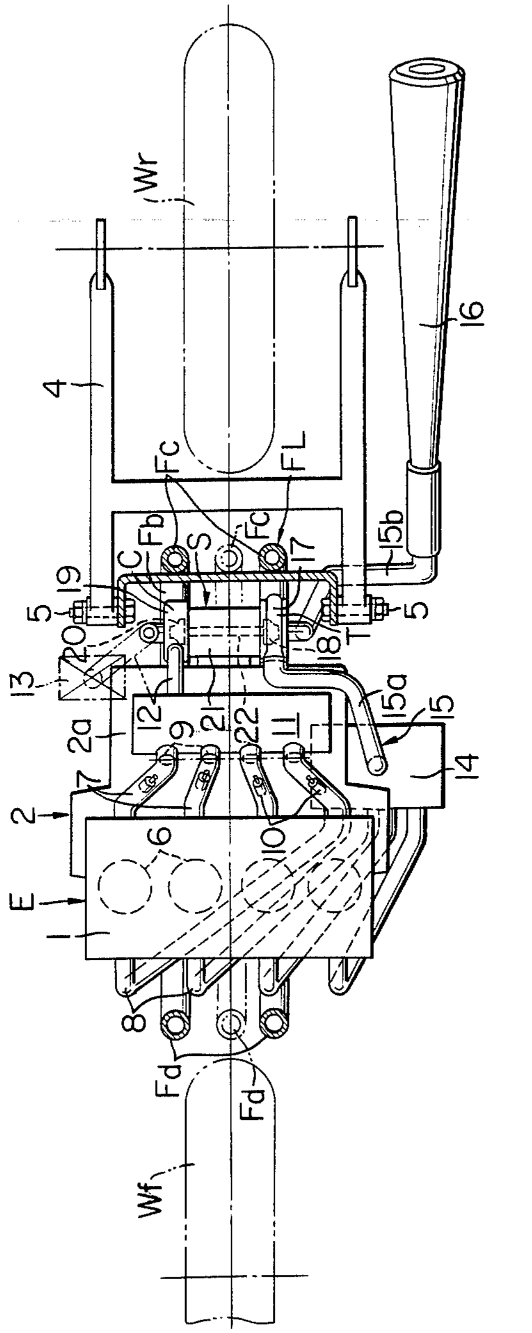

FIGS. 5 and 6 illustrate a third embodiment of the present invention. In FIG. 5, the frame F of the motorcycle is constructed in the form of a cradle having a loop portion FL which consists of a main tube Fm that rearwardly stretches from a head pipe Fh, a down tube Fd that downwardly stretches from the head pipe Fh, a center tube Fc that downwardly stretches from the main tube Fm, and a lower tube Fb which connects the lower end of the down tube Fd to the lower end of the center tube Fc. The engine E is embraced in the loop portion FL, and is supported by the down tube Fd, by the center tube Fc, and by any other suitable portions. The engine E consists of a nearly erected engine block 1, and a transmission case which is formed in the lower portion of the engine block 1 and which also serves as a crank case. The transmission case 2 consists of an upper case 2*a* and a lower case 2*b* that are coupled together as a unitary structure and that can be divided into an upper portion and a lower portion. The turbosupercharger S is mounted on the back surface of the lower case 2*b* in the lower portion of the loop portion FL.

When the frame F is of the type of a double cradle having the down tubes Fd, lower tubes Fb and center tubes Fc each in a pair, it is recommended that the pair of right and left lower tubes Fb, Fb run under the compressor C and the turbine T of the turbosupercharger S as indicated by solid lines in FIG. 6. When the frame F is of the type of a single cradle having the tubes Fd, Fb and Fc each in single, it is recommended that the lower tube Fb runs under the central portion of the turbosupercharger S as indicated by a dotted line in FIG. 6.

The front end of the rear fork 4 is swingably supported, via shaft 5, by the center tube Fc at a position above the turbosupercharger S, and the rear wheel Wr is rotatably supported at the rear end of the rear fork 4 in a customary manner.

A rear damper 56 is pivotted to the main tube Fm as designated at 55 to swing in the upper and lower directions, and the rear end of the rear damper 56 is coupled to the rear fork 4 via the link mechanism L. The link mechanism L consists of a first link 58 of which the one end is pivotted to a middle portion of the center tube Fc as designated at 57 and a second link 60 of which the one end is pivotted to a middle portion of the rear fork 4 as designated at 59, the middle portion of the first link 58 and the free end of the second link 60 being rotatably coupled together through a pin 61. The rear end of the rear damper 38 is coupled by a pin 62 to the free end of the first link 58. With the thus constructed link mechanism L, therefore, the amount of compression of the rear damper 38 increases as the rear fork 4 moves upwards, i.e., the amount of compression of the rear damper 38 increases as the rear wheel Wr moves upwards. That is, the amount of compression of the rear damper 38 changes in a curved manner as the rear wheel Wr moves upwards.

The setup and functions of the engine E provided with the turbosupercharger S of this embodiment are nearly the same as those of the above-mentioned first embodiment, and their description is omitted here.

According to this embodiment, the engine E is mounted in the loop portion FL of the frame F constructed in the form of a cradle, and the turbosupercharger S for compressing intake air is installed in the loop portion FL at the back of the engine E. Therefore, the front side and the lower side of the turbosupercharger S are protected by the engine E and the frame F; i.e., the turbosupercharger S is protected from the obstacles that may enter from the front side or from the lower side when the motorcycle is running. Accordingly, the turbosupercharger S is prevented from being damaged owing to the above-mentioned very simply constructed setup.

Further, the turbosupercharger S, which is mounted in the lower portion of the loop portion of the frame, is protected by the loop portion FL, and comes into good contact with the air that flows through the lower surface of the vehicle. This is desirable to promote the cooling effect for the turbosupercharger S.

Figure 7:
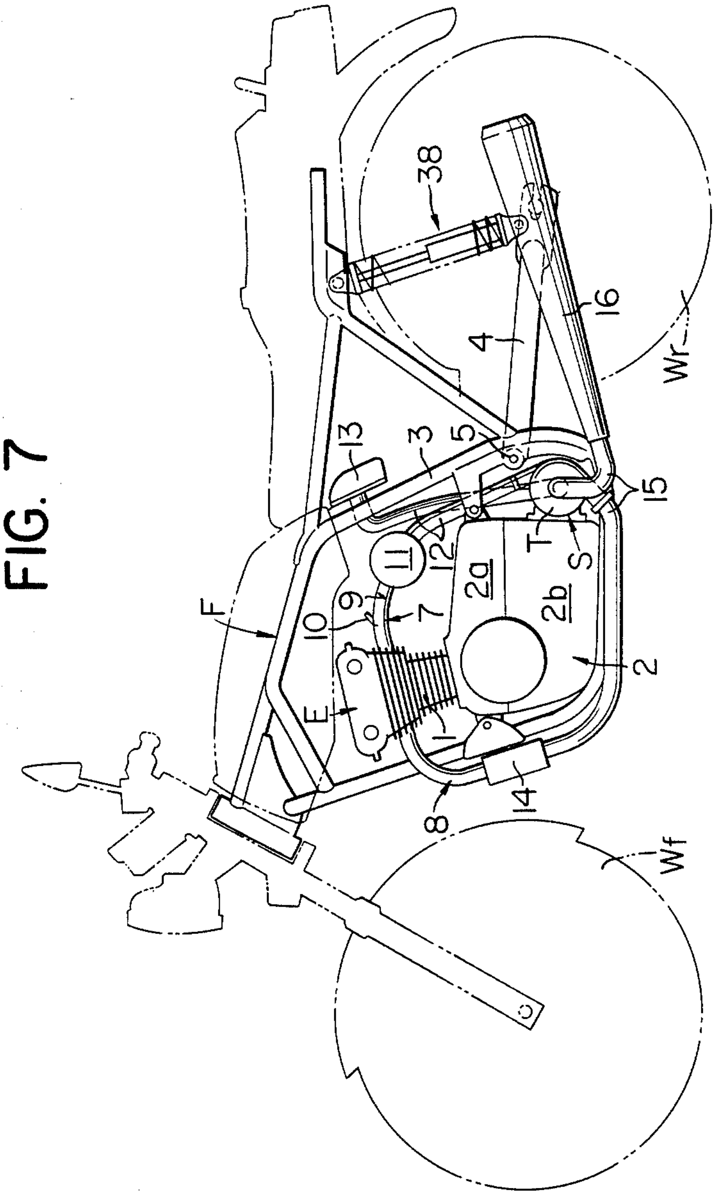
Figure 8:
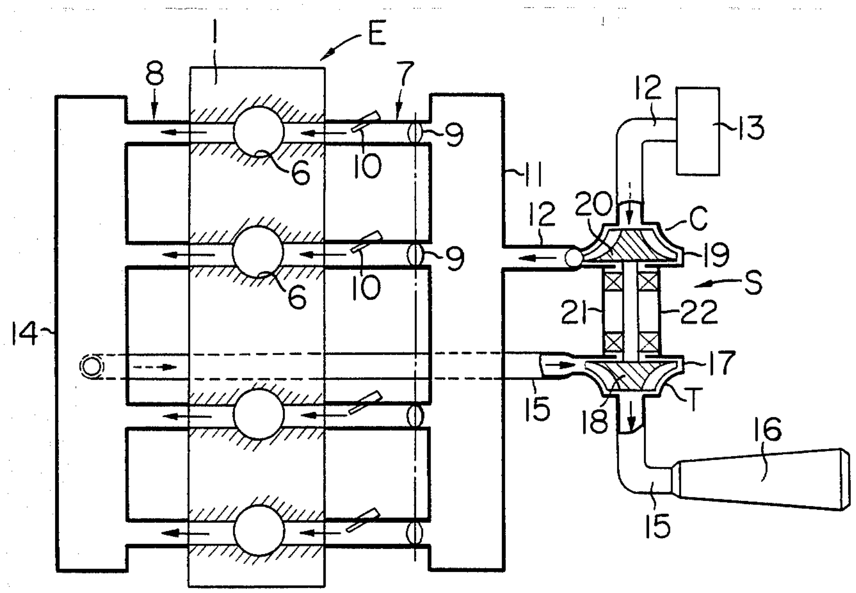

FIGS. 7 and 8 illustrate a fourth embodiment of the present invention, which is constructed nearly similarly to the above-mentioned third embodiment, except that the exhaust collector box 14 is disposed in front of the engine E instead of underneath the engine E, and the rear dampers 38 are directly fitted to the free ends of the rear fork 4 and to the lower portions of the vehicle. According to this embodiment, the front surface of the exhaust collector box 14 receives the wind and is effectively cooled, so that the turbine T is not subjected to excessively high temperatures. Furthermore, the charging efficiency for the cylinders 6 can be effectively enhanced. Further, the exhaust manifold 8 terminates at the front portion of the engine, and its shape can be very simplified. One or a small number of exhaust pipes 15*a* connect the exhaust collector box 14 to the turbine T without being interfered by the shape of the engine. Consequently, the exhaust system as a whole can be laid out simply and neatly, and the appearance of the motorcycle can be improved.

According to the inventive motorcycle, the front end of the rear fork 4 is pivoted at the rear portion of the engine E to swing in the vertical directions, the turbosupercharger S for compressing engine intake air is installed at a position beneath the point at which the rear fork 4 is pivoted to the frame F at the back of the engine E. Therefore, the front side of the turbosupercharger S is protected by the engine E, and is prevented from being damaged by the obstacles that may be encountered from the front direction when the motorcycle is running. Moreover, even when the pivot point of the front end of the rear fork 4 is brought adjacent to the center of gravity of the motorcycle, i.e., brought adjacent to the engine E, the rear fork is not interfered by the turbosupercharger S.

Further, the turbosupercharger S is positioned in offset relation to the transverse center of the engine so that the turbine T is disposed in a position adjacent the outside of the engine. With this arrangement, the turbine T is exposed to winds passing along the outer side surface of the engine for effective cooling thereof during travel of the motorcycle.

The turbine T and compressor C of the turbosupercharger S are arrayed in the transverse direction of the vehicle, and the muffler 16 connected to the turbine T is disposed on the side opposite to the transmission device M that connects the output shaft 25 of the engine E to the rear wheel Wr with the rear wheel Wr interposed therebetween. As a result, a sufficient distance between the transmission device and the exhaust system including the turbine T is maintained without difficulty so that the transmission device can be protected from the heat of the exhaust gas. Consequently, the exhaust system and the transmision device can be laid out easily.

Further, the exhaust collector box 14 is connected with a plurality of exhaust pipes 8 extending from the cylinders 6, and the turbine T of the turbosupercharger S is disposed in the common exhaust pipe 15 connecting the exhaust collector box 14 to the muffler 16 located at one side of the rear wheel Wr. Therefore, the exhaust gas from each of the cylinders 6 of the engine E can continuously act upon the turbine T of the turbosupercharger S via the exhaust collector box 14, so that the turbine T runs stably. Consequently, charging efficiency for the cylinders 6 can be increased.

Moreover, since a strip-like face plate 24 is provided to cover the outer side of the exhaust collector box 14 and the muffler 16 with a ventilation gap formed therebetween, the exhaust collector box 14 and the muffler 16 appear as if they were continuous and are in alignment, contributing to the improvement in the appearance of the motorcycle. Moreover, the face plate 24 prevents splashing muddy water from being adhered onto the exhaust collector box 14, and further helps guide the wind to pass by the side of the exhaust collector box 14. Accordingly, cooling effect for the exhaust collector box 14 is promoted, and the exhaust collector box 14 is prevented from being overheated.

While a few preferred embodiments of the present invention have been shown and described, it will be apparent to those skilled in the art that various changes and modifications may be made herein without departing from the spirit of the invention or the scope of the appended claims.

What is claimed is:

1. A motorcycle comprising a frame member and an engine mounted on said frame member, a rear fork having at least one shaft at its front end connected to said frame member for vertical oscillation, said rear fork supporting at its rear end a rear wheel, a transmission case integrally mounted at the rear of said engine, a supercharger disposed backwardly of said transmission case below said rear fork shaft for compressing intake air fed to said engine, said supercharger comprising a turbine in an exhaust passage means and adapted to be driven by exhaust gas discharged from said engine as well as a compressor disposed in an intake passage means and connected with said turbine for rotation therewith for compressing intake air in said intake passage means, and an air cleaner connected to said compressor of the supercharger through said intake passage means, wherein said intake passage means comprises an upstream portion for connection between said air cleaner and said compressor and a downstream portion having a prechamber interposed therein on the side closer to said engine and being so formed as to extend upwardly from said compressor to pass by said rear fork shaft, said air cleaner being located rearwardly of said prechamber as well as said downstream portion of the intake passage means with respect to the advancing direction of the motorcycle.

2. A motorcycle as set forth in claim 1, wherein said supercharger is arranged within the width of said rear fork.

3. A motorcycle as set forth in claim 1, wherein said frame member is in the form of a cradle having a loop portion, said supercharger being disposed in said loop portion at the back of said engine.

4. A motorcycle as set forth in claim 3, wherein said supercharger is disposed at the lower part of said loop portion.

5. A motorcycle as set forth in claim 1, comprising an intake passage leading to said engine and arranged within the width of said rear fork and between said engine and said rear fork.

6. A motorcycle as set forth in claim 1, wherein said engine comprises a plurality of cylinders and an exhaust manifold extending therefrom, an exhaust collector disposed in front of said cylinders and connected to said exhaust manifold, and means extending from said exhaust collector to said turbine for introducing exhaust gas to said turbine.

7. A motorcycle as set forth in claim 1, wherein said turbine is disposed adjacent an outer side surface of said engine in a position offset from the transverse center of said engine toward one side thereof.

8. A motorcycle as set forth in claim 1, wherein said supercharger is arranged such that said turbine and said compressor are aligned in the transverse direction of said motorcycle, said motorcycle further comprising a muffler leading to said turbine, and a transmission device connecting between said rear wheel and an output shaft of said engine, said muffler and said transmission device being disposed on the opposite sides of said rear wheel.

9. A motorcycle as set forth in claim 1, wherein said engine comprises a plurality of cylinders and a plurality of independent exhaust passages extending from said respective cylinders, an exhaust collector connected to said exhaust passages, a muffler disposed at one side of said rear wheel, a common exhaust pipe extending from said exhaust collector to said muffler, said turbine arranged in said common exhaust pipe, and a face plate extending from said exhaust collector to said muffler for covering the outside surfaces thereof with an airflowing gap formed therebetween.

10. A motorcycle as set forth in claim 1, further comprising a protector means for covering the lower surface of said supercharger.

11. A motorcycle as set forth in claim 10, wherein said frame member includes a lower tube portion extending beneath said supercharger, said lower tube portion serving as said protector means.

* * * * *